United States Patent Office 3,455,978
Patented July 15, 1969

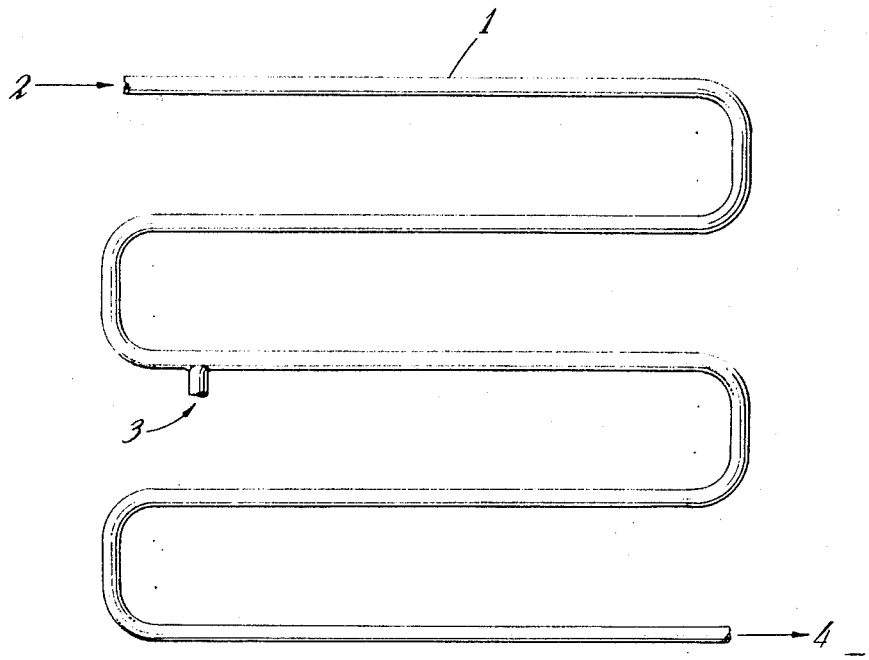

3,455,978
PROCESS FOR PRODUCING TRIALKOXY-ALUMINUM COMPOUNDS
Norman T. Richardson, South Charleston, and Francis H. Small, Charleston, W. Va., assignors to Union Carbide Corporation, a corporation of New York
Filed Sept. 19, 1966, Ser. No. 580,198
Int. Cl. C07f 5/06
U.S. Cl. 260—448                              5 Claims

ABSTRACT OF THE DISCLOSURE

A continuous process for producing trialkoxyaluminum compounds by the oxidation of trialkylaluminum compounds in a tubular reactor is disclosed and claimed.

---

This invention relates to a continuous improved process for the production of trialkoxyaluminum compounds by the oxidation of trialkylaluminum compounds.

The oxidation of hydrocarbylaluminum compounds, such as the trialkylaluminum compounds, with air and oxygen is well known. The procedures previously used have entailed blowing the oxidant for a prolonged period of time through the trialkylaluminum compound, neat or in solution; the process being carried out in a batchwise manner or in a continuous stirred tank reactor. Thus, for example, in U.S. 2,892,858 the oxidation process required a period of several hours for completion. In U.S. 3,042,696 the oxidation was carried out under pressure in an attempt to shorten the reaction period; however the shortest period shown was 48 minutes in Example 5. A two stage procedure was employed in the batch process disclosed in U.S. 3,097,226, but this still required many hours to complete the reaction; in Example 1 a total of 17 hours for 9 ml. of trihexylaluminum. U.S. 3,153,076 also describes a two stage batch process that requires periods in excess of 45 minutes for completion. Similar processes are described in U.S. 3,070,616 and U.S. 3,087,954. All of these procedures are thus seen to be batch processes requiring a relatively long period of time for completion of the reaction. Further, the known procedures often produce by-product carbonyl compounds in undesirably high yields.

It has now been found that the oxidation can be carried out continuously at high yields and efficiencies in a tubular type reactor. In the process of the instant invention conversions up to about 80% and efficiencies to alkanol as high as 99% have been achieved in a matter of seconds, as compared to the long periods of time required by the prior processes.

The process of this invention is carried out continuously in a tubular reactor. This manner of reaction has not heretofore been known for the oxidation of trialkylaluminum compounds. It was always believed that a prolonged reaction time was necessary to produce the trialkoxyaluminum compounds and it was therefore unexpected and unobvious that this reaction could be carried out so efficiently in a tubular reactor in so short a period of time. The tubular reactor employed has a high length to diameter ratio, usually greater than about 500:1, though length to diameter ratios as low as 100:1 and as high at 5000:1 can be used. The tubular reactor is further equipped to permit the introduction of oxidant or other chemicals at various points along the length thereof. These side injection points can be located at points from about 5 percent to about 75 percent of the distance between the initial inlet point and the terminal discharge point.

The schematic drawing, not to scale, illustrates a suitable apparatus for practicing the invention. Trialkyl aluminum compound and oxidant gas are introduced into the tubular reactor 1, through the inlet 2. At the same time, oxidant gas is fed into the tubular reactor 1 at one or more side points 3. The reaction product leaves the tubular reaction zone at the terminal discharge point 4. The drawing is diagrammatic in form and shows only one side point. Those skilled in the art will understand that additional side points can be used and that apparatus elements such as pumps, compressers, coolers, valves, condensers, controls, and the like are necessary.

The oxidation reaction is carried out at from about 10° C. to about 150° C., preferably from about 50° C. to about 100° C. The pressure can vary from atmospheric pressure up to about 1000 p.s.i.g., preferably up to about 75 p.s.i.g.

The trialkylaluminum compounds are well known; they can be represented by the formula:

wherein each R is an alkyl group containing from 2 to 30 carbon atoms. The manner in which such compounds can be produced are well known as are the compounds themselves and the U.S. patents previously referred to disclose procedures by which they are produced as well as the compounds themselves, all of which is incorporated herein by reference. When the trialkylaluminum compounds are produced by the growth reaction, i.e. the reaction of a lower alkylaluminum with an olefin compound as disclosed in U.S. 2,892,858 and U.S. 3,042,-696, the R groups may have different molecular weights. This, however, has no noticeable effect on the process of the instant invention since mixtures of trialkylaluminum compounds can be used as well as those compounds having alkyl chains of different lengths in the same molecule.

The trialkoxyaluminum compounds produced can be hydrolyzed by known procedures to produce the corresponding alcohols, U.S. 3,042,696.

In the process of this invention, the trialkylaluminum compound, neat or in solution in an inert solvent, enters the tubular reactor at the inlet. Among the inert solvents are the liquid paraffinic and aromatic hydrocarbons such as benzene, cumene, toluene, xylene, hexane, nonane, decane, octane, and the like. The solvent can comprise from 5 to 95 percent by volume of the solution and its concentration is not critical. An oxidant gas, i.e. a gas stream containing oxygen free of other reactive elements, for example air, is also fed into the reactor at the initial inlet location, and at one or more side points air, oxygen or a mixture thereof is injected into the reactor. Limiting the amount of oxygen introduced at any one point of the reactor in this manner, by addition thereof through multiple injection points, avoids local overheating with consequent formation of undesirable carbonyl by-products and provides a ready means for controlling the reaction. The reactor is preferably filled with an inert packing to maximize turbulence and obtain more intimate contact between oxidant and reactant. Any inert packing material can be used for this purpose; these materials being well known to those skilled in the art. Upon completion of the oxidation, the trialkoxyaluminum compounds produced are separted from the gases and they can either be hydrolyzed directly to the alcohols or they can be recovered from the diluent if desired.

It has been found that in a single pass through the reactor conversion of trialkylaluminum to trialkoxyaluminum of greater than 65% and up to about 90% are obtained at contact times as short as about 30 seconds.

Example 1

Through the initial inlet of a coiled stainless steel tubular reactor having an inside diameter of ¼ inch and a length of 110 feet there was fed at room temperature a 10 percent by volume solution of tri-n-octylaluminum in benzene at a rate of 25 cc. per minute. Air was also introduced through the initial inlet at a rate of 350 cc. per minute. At side inlets, located at points 10 feet and 30 feet from the initial inlet, oxygen was introduced into the reactor at a rate of 158 and 148 cc. per minute at each side point respectively. Contact time in the reactor was an average of 45.1 seconds. Conversion to tri-n-octyloxyaluminum was 70.3 percent. The tri-n-octyloxyaluminum was hydrolyzed to 1-octanol at an efficiency of 99 percent.

In a manner similar to that described in Example 1, a series of examples was carried out varying the temperature, air feed, oxygen feed and contact time. These examples are summarized below:

| Example | 2 | 3 | 4 |
|---|---|---|---|
| Temperature, °C | 90 | 60 | 100 |
| Pressure, p.s.i.g | Atm. | 30 | 50 |
| Air feed at initial inlet, cc./min | 230 | 473 | 493 |
| Oxygen feed, cc./min.; | | | |
| 10 feet side inlet | 137 | 185 | 217 |
| 30 feet side inlet | 141 | 166 | 233 |
| Contact time, sec | 66.4 | 37.0 | 32.6 |
| Conversion, percent | 72.5 | 80.8 | 68.2 |
| Efficiency, percent | 99.2 | 99.2 | |

The data clearly shows that high conversions are obtained in a matter of seconds by the process of the instant invention as compared to the conversions obtained by the prior art batch processes over prolonged reaction periods. Similar results are obtained when air is introduced via the side inlets.

What is claimed is:

1. A continuous process for rapidly oxidizing trialkylaluminum compounds wherein each alkyl group thereof contains from 2 to 30 carbon atoms, which comprises continuously introducing said trialkylaluminum compounds into a tubular reaction zone having a length to diameter ratio greater than about 100:1 at the inlet end of said zone and simultaneously therewith introducing oxidant gas at least two points, the first oxidant gas stream being injected into the tubular reaction zone at the inlet end of said zone and the subsequent oxidant gas streams being injected into the tubular reaction zone at side locations along said zone; said process conducted at temperatures of from about 10° C. to about 150° C. and up to about 100 p.s.i.g. total pressure.

2. The process as claimed in claim 1, wherein the trialkylaluminum compound is diluted with an inert solvent.

3. The process as claimed in claim 1, wherein the first oxidant gas stream is air.

4. The process as claimed in claim 1, wherein the subsequent oxidant gas streams are oxygen.

5. The process as claimed in claim 1, wherein the reactor is packed with an inert packing material.

References Cited

UNITED STATES PATENTS

| | | | |
|---|---|---|---|
| 3,024,280 | 3/1962 | Braun | 23—252 XR |
| 3,256,067 | 6/1966 | Shriver et al. | 23—252 XR |
| 2,863,895 | 12/1958 | Kirshenbaum et al. | |
| 2,892,858 | 6/1959 | Ziegler. | |
| 2,971,969 | 2/1961 | Lobo. | |
| 3,042,696 | 7/1962 | Aldridge. | |
| 3,070,616 | 12/1962 | Flanagan. | |
| 3,087,954 | 4/1963 | McClaflin. | |
| 3,097,226 | 7/1963 | Napier. | |
| 3,153,076 | 10/1964 | Wood et al. | |

FOREIGN PATENTS

| | | |
|---|---|---|
| 136,372 | 1961 | U.S.S.R. |

TOBIAS E. LEVOW, Primary Examiner

H. M. S. SNEED, Assistant Examiner

U.S. Cl. X.R.

23—252